May 28, 1929.　　　G. A. DE VLIEG　　　1,714,499

GRINDING MACHINE

Original Filed Dec. 17, 1924　　10 Sheets-Sheet 1

Inventor:
Gerard A. DeVlieg

May 28, 1929.　　　G. A. DE VLIEG　　　1,714,499

GRINDING MACHINE

Original Filed Dec. 17, 1924　　10 Sheets-Sheet 2

May 28, 1929.  G. A. DE VLIEG  1,714,499
GRINDING MACHINE
Original Filed Dec. 17, 1924  10 Sheets-Sheet 4

Inventor:
Gerard A. DeVlieg
By
Lindahl Carter Carlson Attys

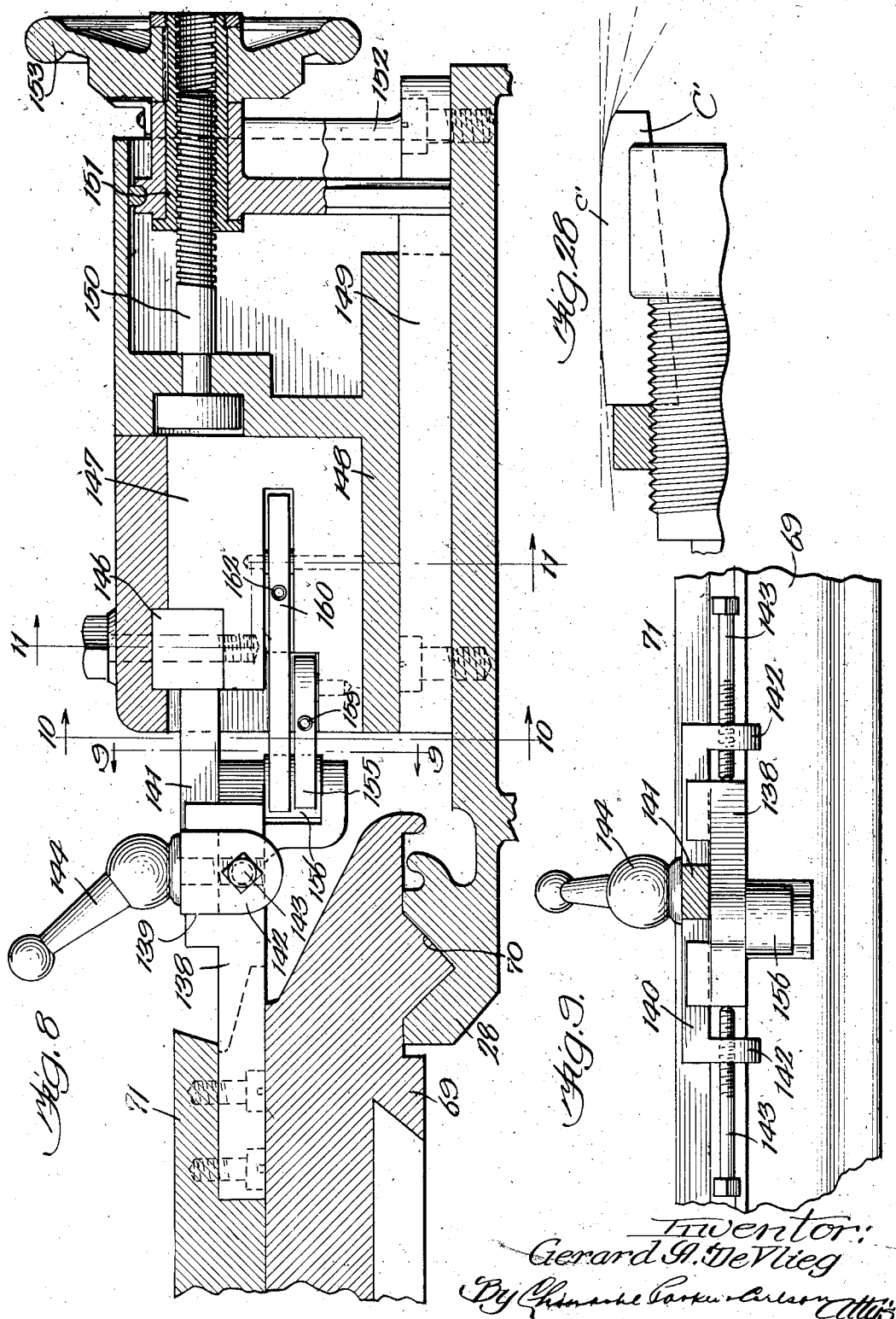

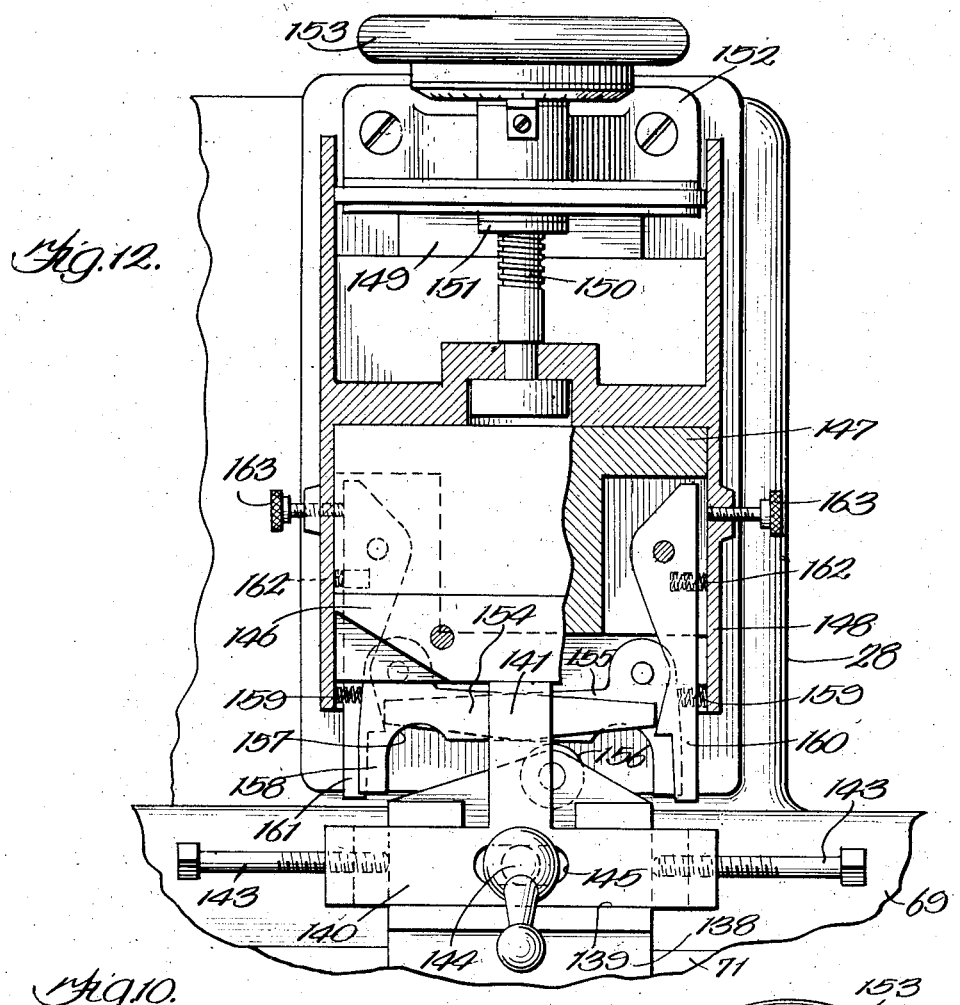
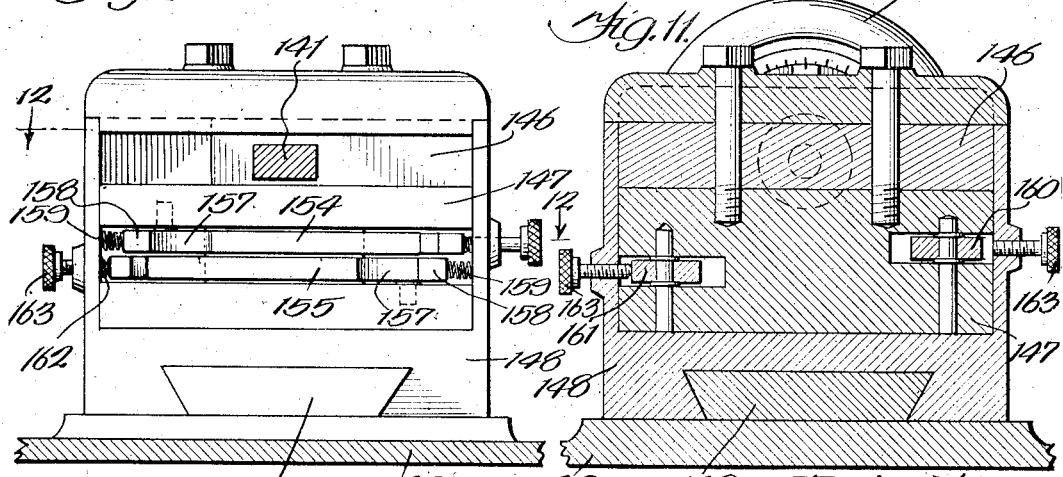

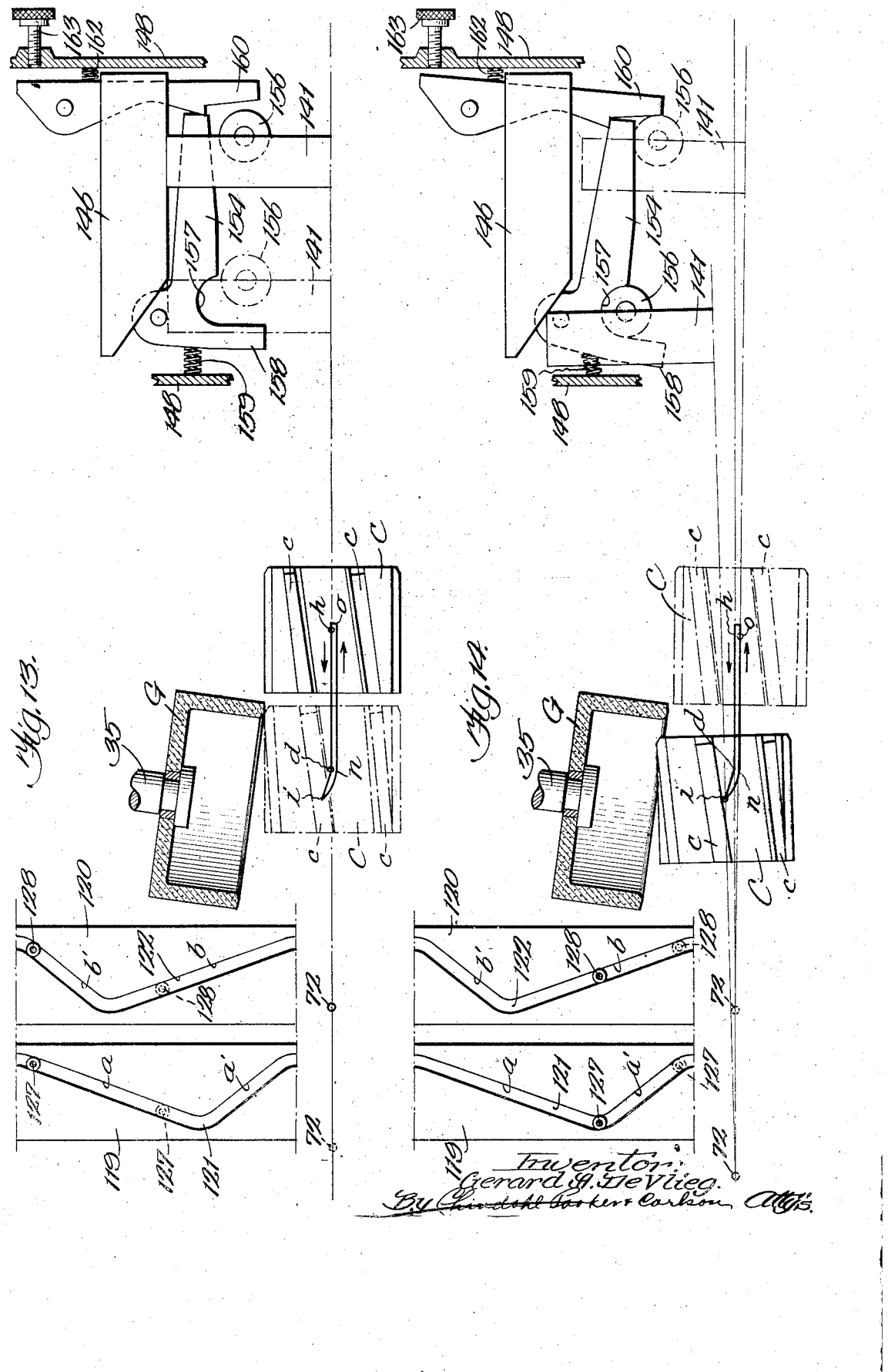

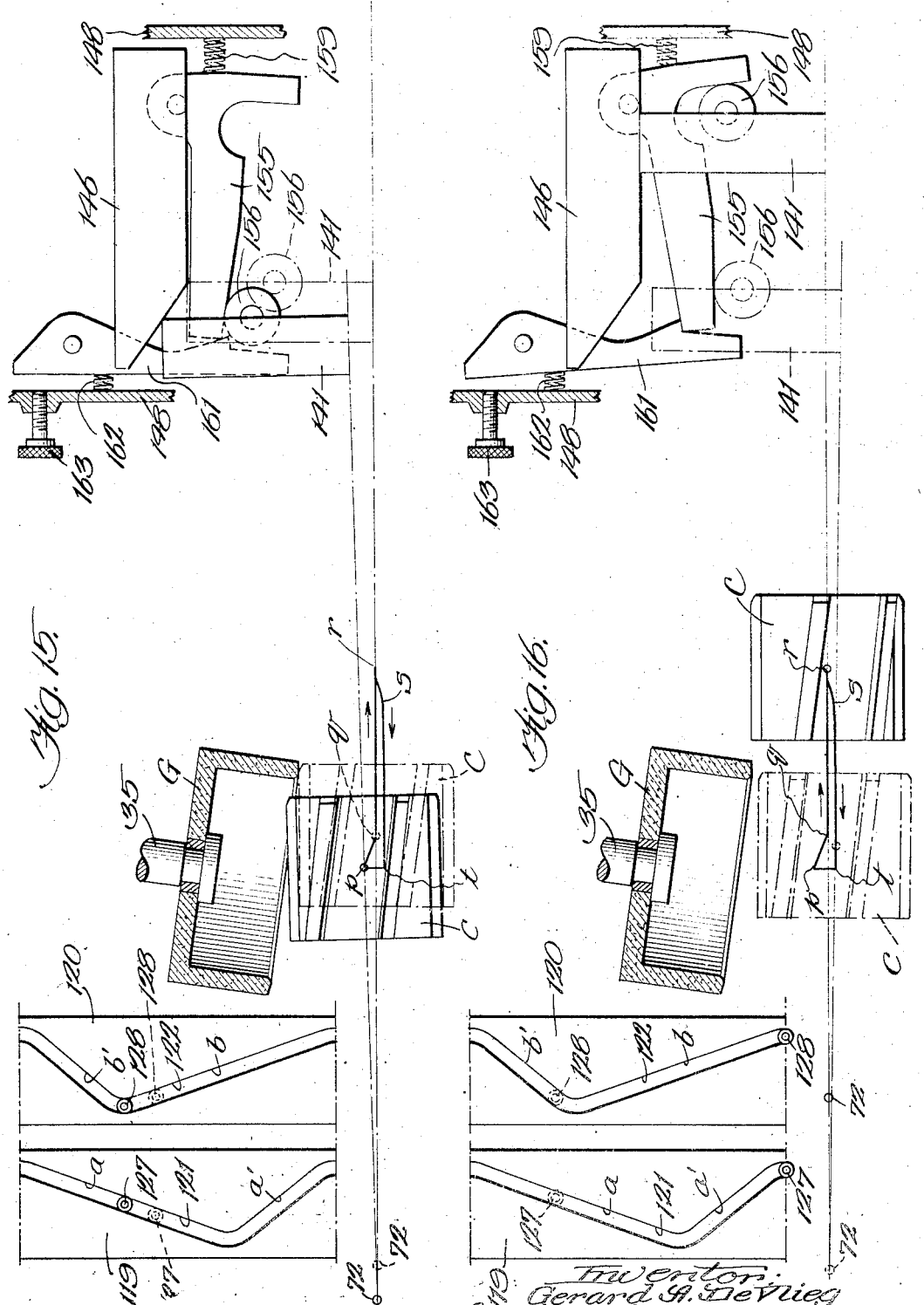

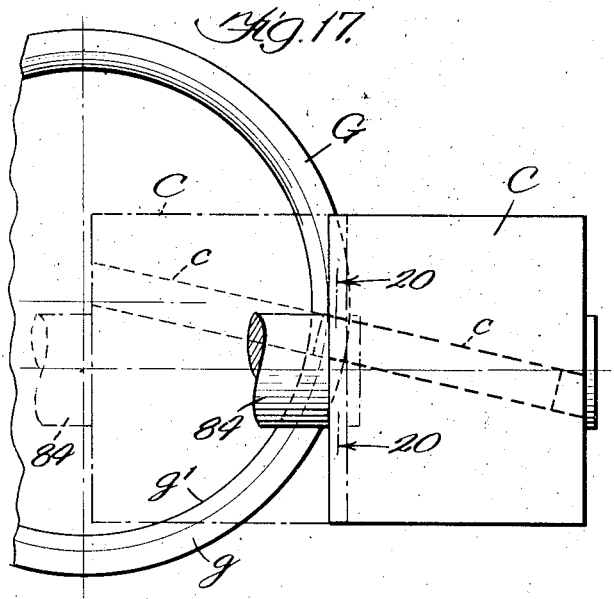
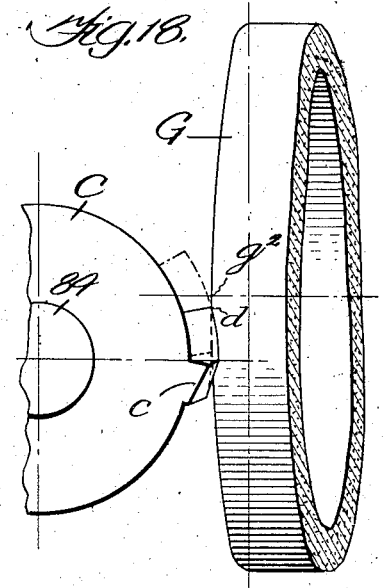
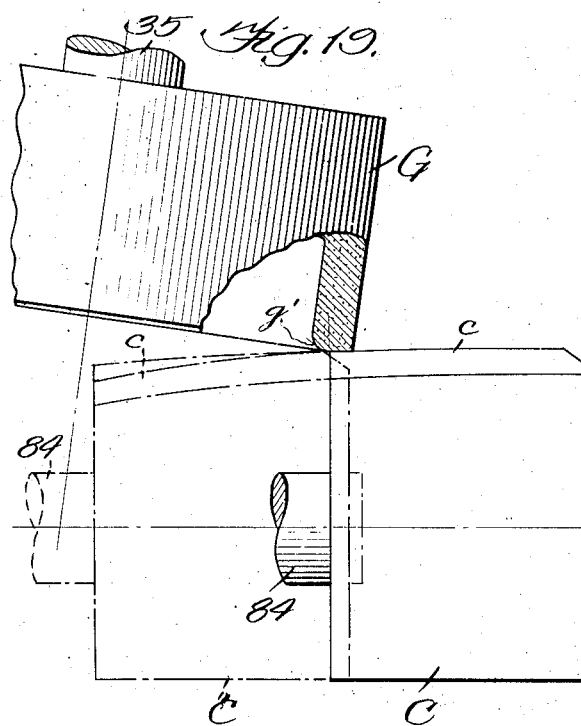
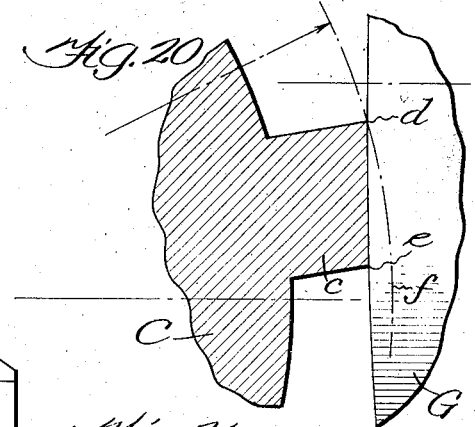
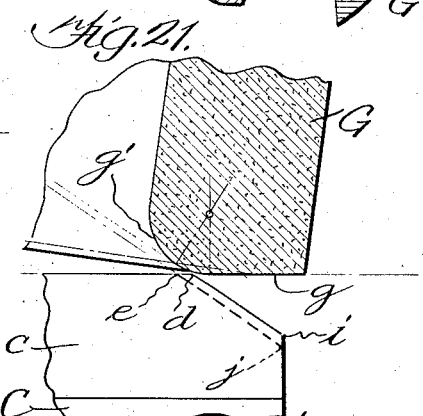

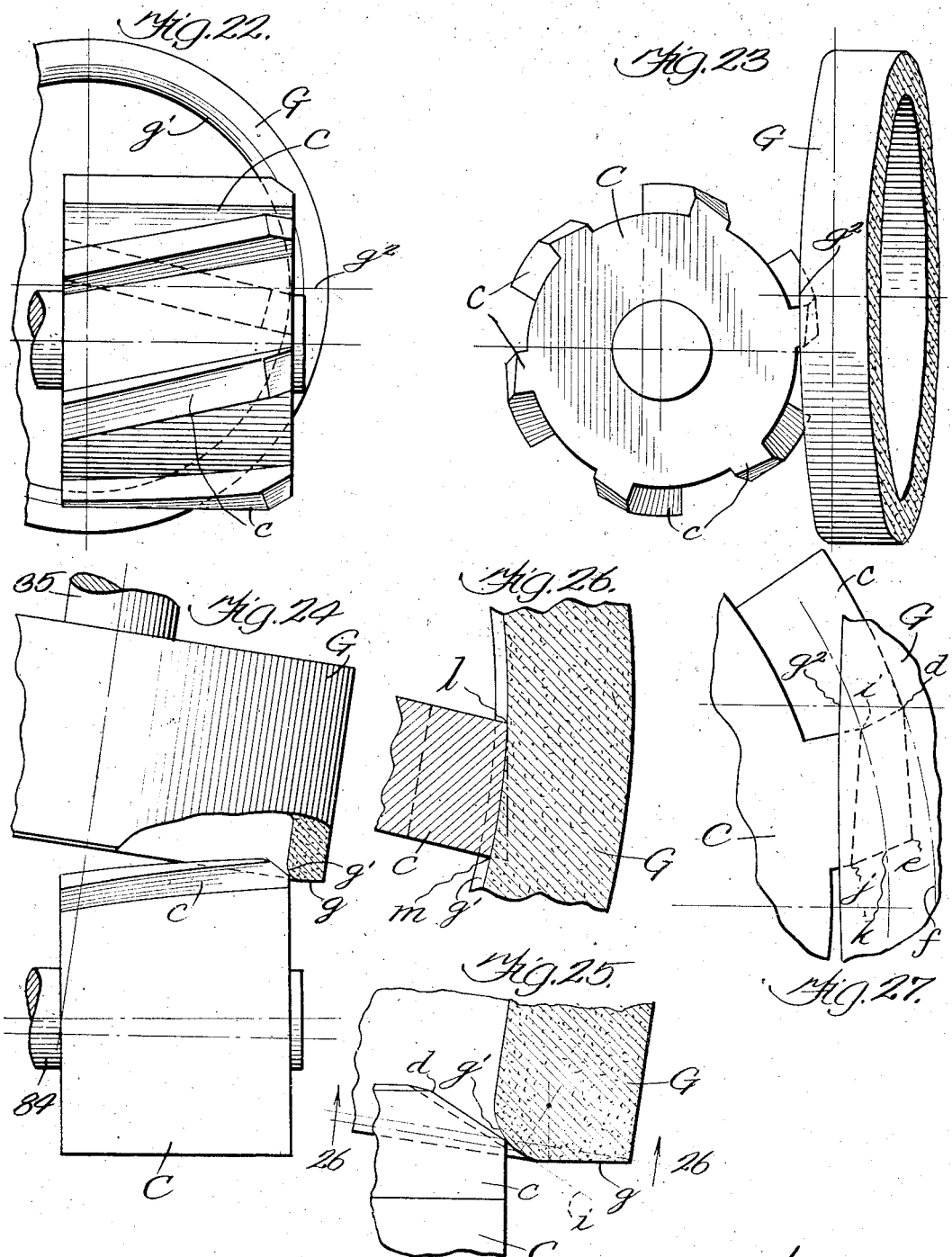

Patented May 28, 1929.

1,714,499

UNITED STATES PATENT OFFICE.

GERARD A. DE VLIEG, OF ROCKFORD, ILLINOIS.

GRINDING MACHINE.

Application filed December 17, 1924, Serial No. 756,418. Renewed March 5, 1929.

The present invention relates to improvements in grinding machines, particularly those used in grinding tools such as rotary cutters and reamers.

The primary object of the invention is to provide a novel machine for grinding helical cutting edges in which the edge is simultaneously reciprocated and rotated across an annular laterally inclined grinding face to provide a gradually accelerated relief.

Further objects and advantages will become apparent as the description proceeds.

In the accompanying drawings, Figure 1 is a fragmentary front elevation partially in section of a grinding machine embodying the features of my invention.

Fig. 5 is a detail view, partly in section, of the gage for setting the work relative to the grinding wheel.

Fig. 6 is a horizontal section of the gage.

Fig. 7 is a fragmentary section taken in the plane of line 7—7 of Fig. 2, and showing the driving connection between the work carriage and the reciprocating mechanism.

Fig. 8 is a vertical section of the oscillating mechanism for the work carriage taken substantially along line 8—8 of Fig. 2.

Fig. 9 is a fragmentary view taken along line 9—9 of Fig. 8.

Fig. 10 is a vertical section taken along line 10—10 of Fig. 8.

Fig. 11 is a vertical section taken along line 11—11 of Fig. 8.

Fig. 12 is a horizontal section taken along line 12—12 of Fig. 10.

Figs. 13 and 14 are diagrammatic views illustrating different stages in one cycle of the grinding operation for a left hand rotary cutter.

Figs. 15 and 16 are views corresponding to Figs. 13 and 14 for a right hand rotary cutter.

Fig. 17 is a front diagrammatic view showing the position of a left hand cutter at the beginning of the grinding cut.

Fig. 18 is a right end view thereof.

Fig. 19 is a plan view thereof.

Fig. 20 is a diagrammatic view taken along line 20—20 of Fig. 17, and illustrating the degree of relief on the cutter blades resulting from the grinding operation.

Fig. 21 is a diagrammatic view illustrating the manner in which the bevel or lead on the ends of the blades is formed, and showing the position of one of the cutter blades at the beginning of its lateral movement into the grinding wheel.

Fig. 22 is a view similar to Fig. 17, and showing the position of the cutter at the completion of the grinding cut.

Fig. 23 is a right end view thereof.

Fig. 24 is a plan view thereof with the grinding wheel shown partly in section.

Fig. 25 is a diagrammatic view similar to Fig. 21, and showing the position of the blade at the completion of the grinding stroke which includes the beveling cut.

Fig. 26 is a fragmentary section taken in the plane of line 26—26 of Fig. 25, and illustrating the degree of relief provided on the beveled ends of the blades.

Fig. 27 is a diagrammatic view illustrating the relief for the cutting edges and the relief for the leads or beveled edges.

Fig. 28 is a fragmentary sectional view of a piston reamer in which the lead end of the blade is formed with a series of differently inclined bevels.

Figure 1:
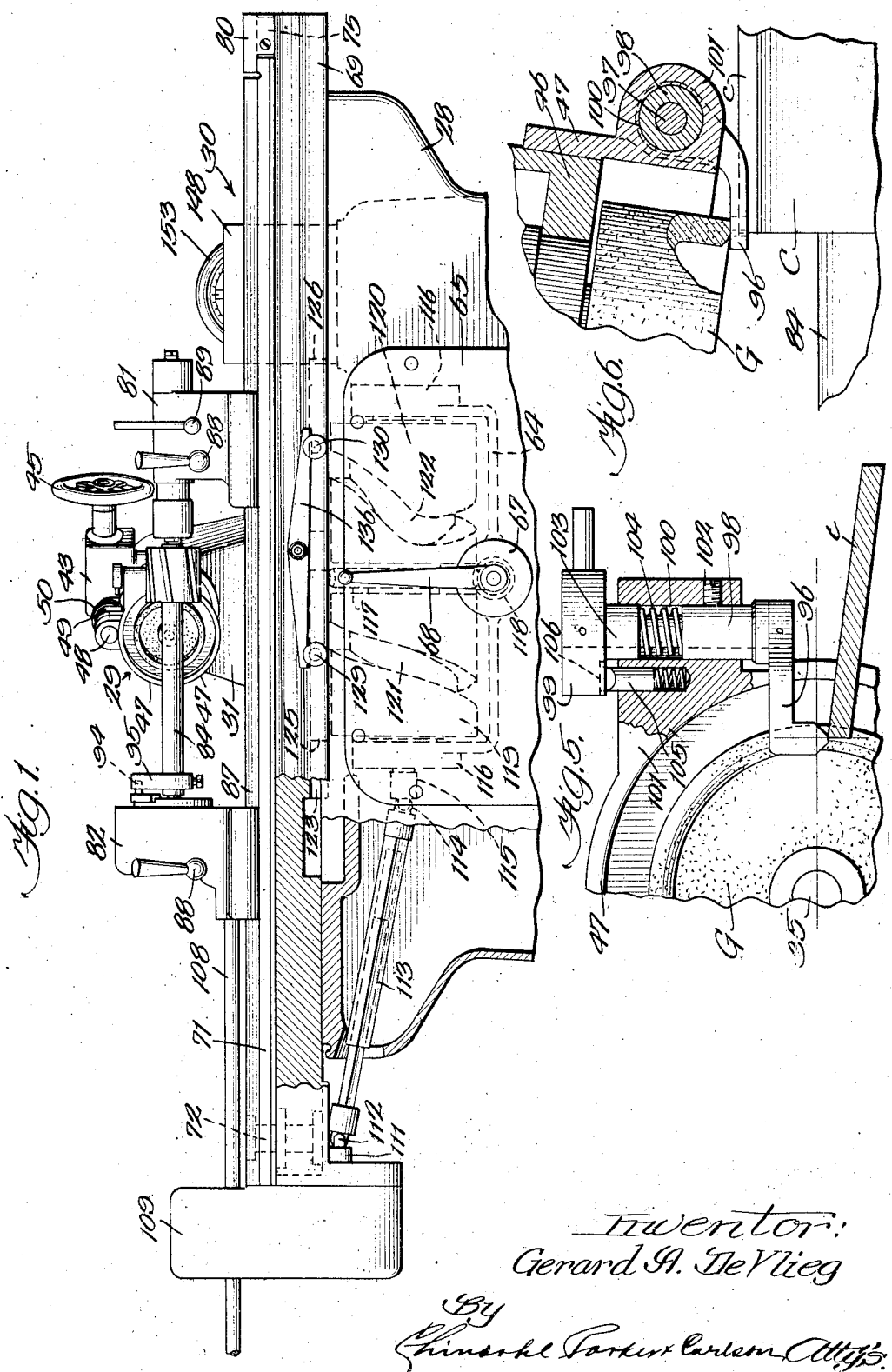

While the invention is susceptible of various modifications and alternative constructions, I have shown in the drawings and will herein describe in considerable detail the preferred embodiment thereof, but it is to be understood that I do not thereby intend to limit the invention to the particular form disclosed but aim on the contrary to cover all modifications and alternative constructions falling within the spirit and scope of the appended claim.

Referring to the exemplary embodiment of the invention, 28 designates the bed or base of the grinding machine on which are mounted a grinding spindle mounting 29 and a work carriage 30.

Figure 2:
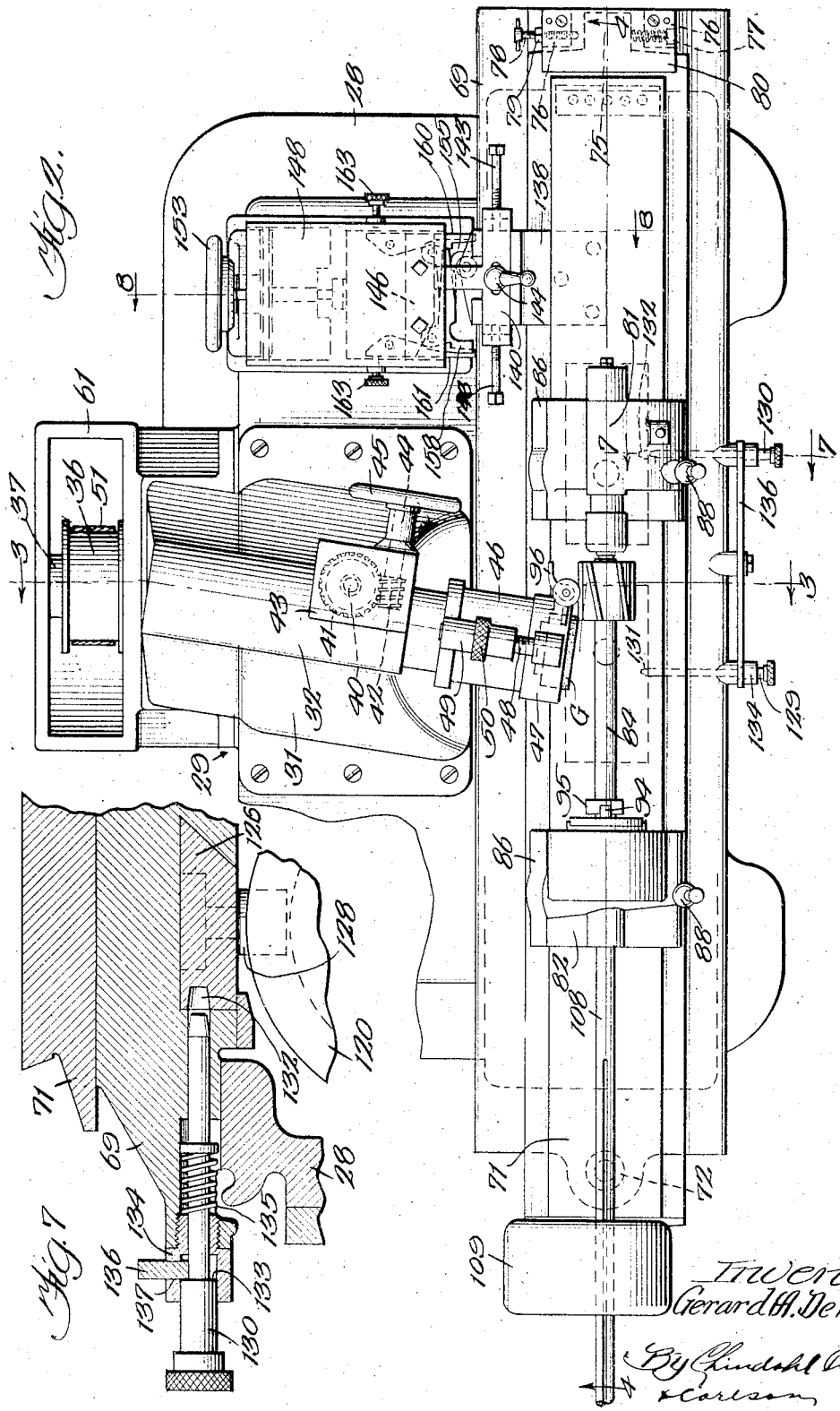
Fig. 2 is a plan view.
Figure 3:
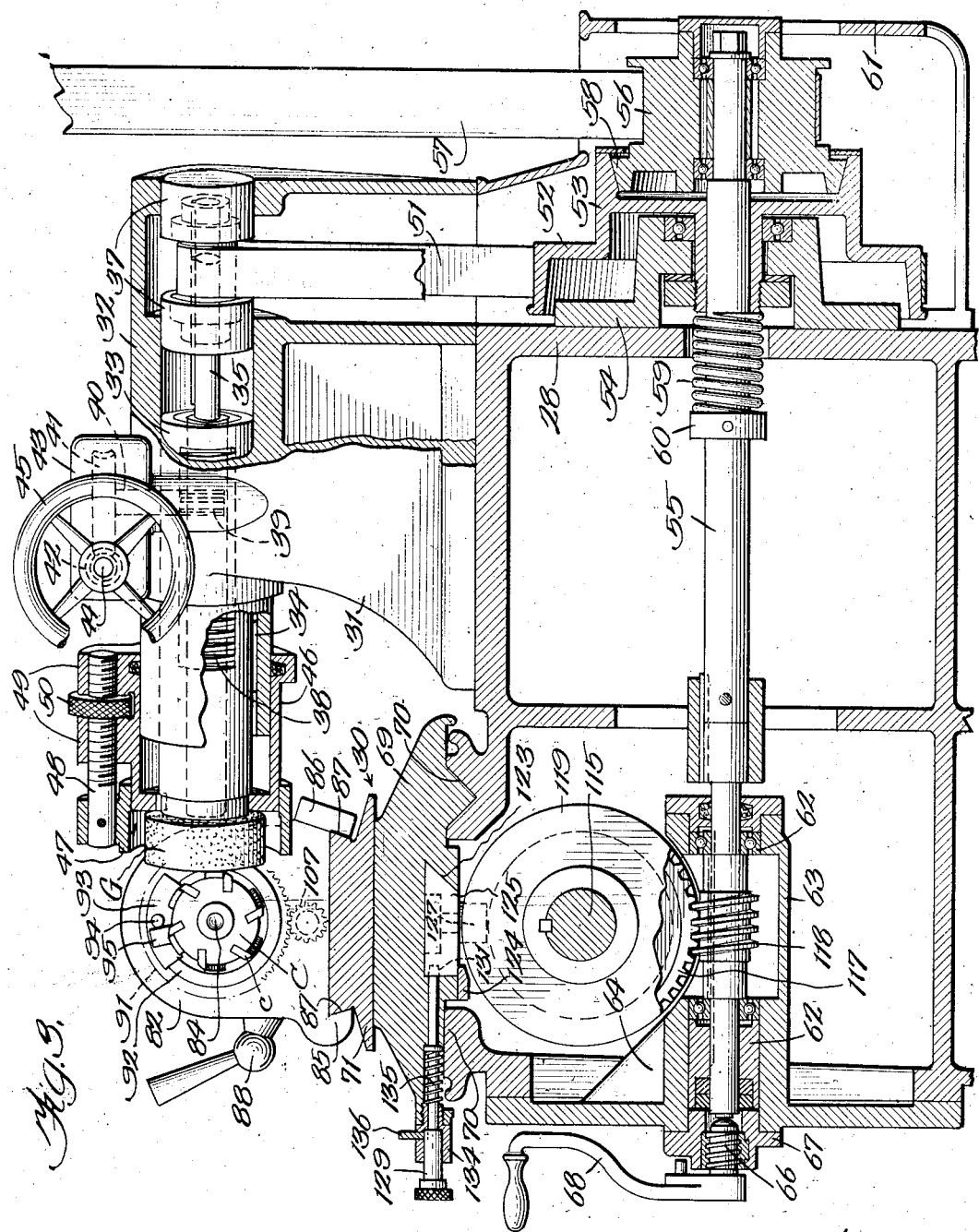
Fig. 3 is a transverse section taken substantially along line 3—3 of Fig. 2.
Figure 4:
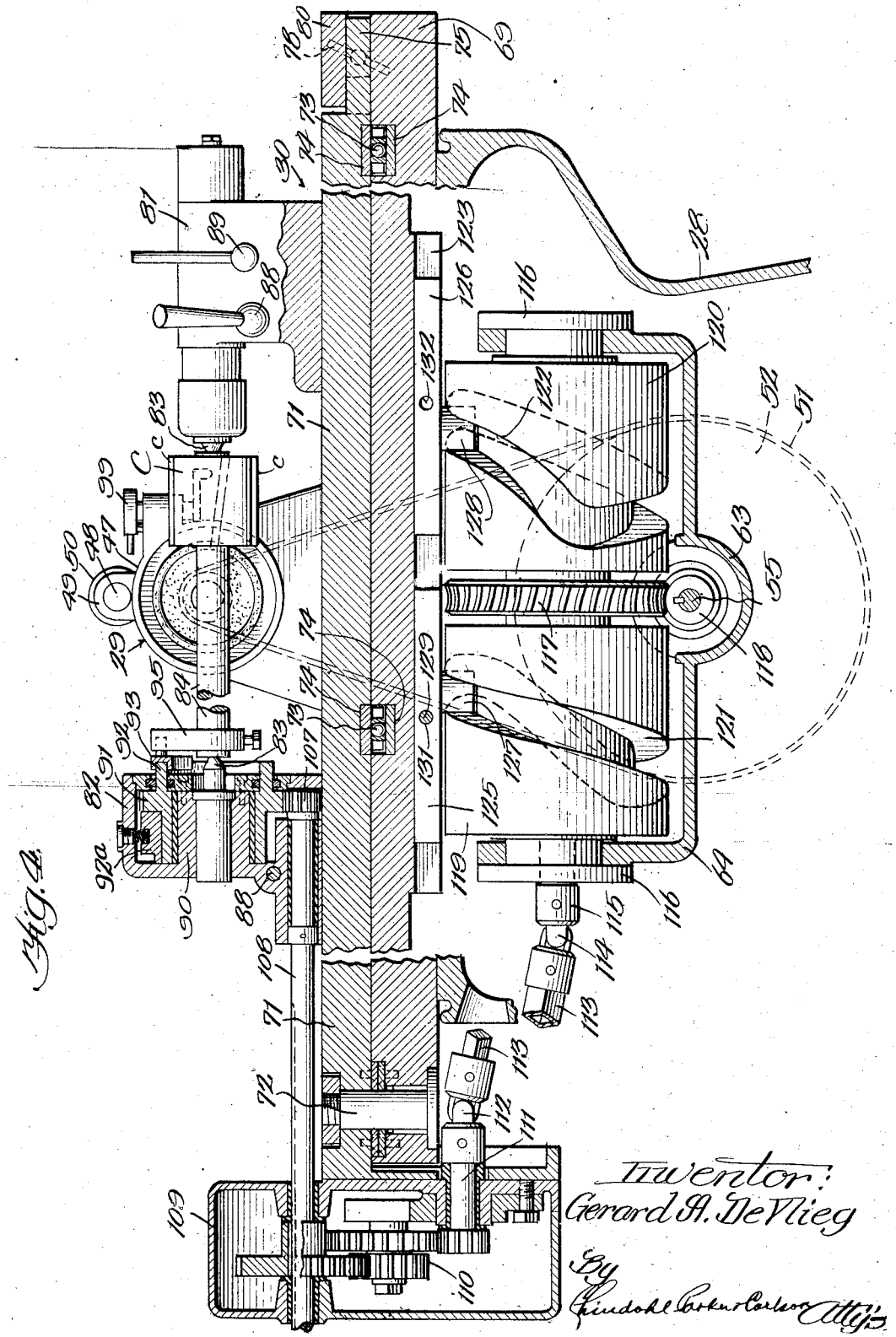
Fig. 4 is a longitudinal section taken along line 4—4 of Fig. 2.

The grinding spindle mounting (see Figs. 2 and 3) comprises a standard 31 mounted on the rear of the machine bed 28, and formed with a tubular housing 32 which extends substantially transversely of the bed. A long sleeve 33 is slidably mounted in the housing, and is held against rotation by a key 34. Journaled in the sleeve 33 and longitudinally movable therewith is a rotary spindle 35, the front end of which is provided with a grinding wheel G of suitable form, and the rear end of which is splined to a pulley 36 rotatably mounted in bearings 37 in the rear end of the housing 32. The sleeve 33 is formed on one side with longitudinally disposed rack teeth 38 in mesh with a pinion 39 on a vertical stub shaft 40. The latter is geared through a worm gear 41 and worm 42 in a gear housing 43 on the standard 31 to a shaft 44 having a hand wheel 45, thereby providing means for adjusting the grinding wheel axially to compensate for wear or for variations in size. Mounted on the front end of the sleeve 33 for movement therewith is a dust guard in the form of a cylindrical housing 46 which telescopes with a front end of the housing 32. A hood 47 for the grinding wheel G telescopes with the front end of the housing 46, and can be adjusted by means of a non-rotatable screw 48 extending rearwardly through two spaced lugs 49 on the housing and carrying an adjusting nut 50 between said lugs.

Preferably, the grinding wheel G is cup-shaped in form. The annular surface thereof constitutes the grinding face, and its inner peripheral edge is rounded to form each radial element with a straight outer section $g$ and a curved inner section $g'$. To position one side of the grinding face in advance of the other, and thereby prevent interference of the latter with the work, the supporting housing 32 is slightly inclined in a horizontal plane with respect to a transverse plane through the base. This inclination (see Figs. 18 and 23) results in a gradual recession of the grinding face at opposite sides of the foremost horizontal element $g^2$ from a longitudinal plane through the base. The area composed of the sections $g$ is inclined rearwardly with respect to its plane of rotation so that the horizontal element $g^2$ is substantially parallel to the carriage 30.

To drive the grinding spindle 35, (see Fig. 3) the pulley 36 is connected through a belt 51 to a pulley 52 which is formed integral with a clutch member 53 suitably supported in a bearing bracket 54 on the rear side of the machine base. Extending slidably but non-rotatably through the clutch member 53 is a drive shaft 55 on the rear end of which a pulley 56 is rotatably mounted. This pulley is adapted to be driven by a belt 57 deriving power from any suitable source, and is formed with an annular clutch flange 58 movable upon reciprocation of the shaft 55 into or out of frictional engagement with the clutch member 53. A heavy coil spring 59 disposed between a collar 60 on the shaft 55 and a sleeve on the clutch member tends to move the shaft and pulley forwardly to connect the power. The clutch mechanism is suitably enclosed by a housing 61 secured to the rear side of the machine base, and opening at the top to the inside of the standard 31. The front end of the shaft 55 is slidably and rotatably supported in bearings 62 which are mounted in a tubular sleeve 63 on an inwardly extending bracket 64 formed on a front plate 65 of the base. Rearward movement of the shaft 55 to throw off the power can be effected by means of a screw 66 which is threaded through a cap 67 in the front end of the sleeve 63 into engagement with the front end of the shaft, and which is provided with a suitable hand lever 68.

The work carriage 30 comprises a long narrow slide or sub-base 69 (see Figs. 1 to 4) which is mounted for longitudinal reciprocation on ways 70 on the bed 28, and a table 71 which is mounted on said sub-base for pivotal movement about a stud 72 at its left end. Ball bearings 73 mounted in complementary grooves 74 in the sub-base and the table serve to facilitate this movement. The free end of the table 71 is provided with a reduced extension 75 which is movable between two spaced blocks 76 on the sub-base 69, and which is pressed rearwardly by a coil spring 77 mounted in the front block. Rearward movement of the extension 75 can be prevented or limited to the desired extent by means of a hand screw 78 threaded through the rear block 76 and having a lock nut 79. A plate 80 secured to the blocks 76 slidably engages the upper surface of the extension 75, and thereby serves to hold the table 71 against vertical displacement on the sub-base 69.

Adjustably mounted on the right and left ends respectively of the table 71 are a tailstock 81 and a headstock 82 having opposed centers 83 on which a suitable arbor 84 is rotatably mounted. The axis of the arbor 84 is located in a plane below that of the grinding spindle axis for a purpose hereinafter set forth. In the present instance, each stock is formed with a guideway 85, and provided with a gib 86 (see Fig. 3), respectively engaging and adapted to be clamped against two inclined longitudinal guides 87 formed in the side edges of the table 71. Each gib 86 is supported by a clamp screw 88 extending through the body of the stock. The center 83 of the tailstock 81 is longitudinally adjustable in the latter, and can be clamped in position by means of a set screw 89. The arbor 84 is adapted to support any one of a large variety of cutters or blade holders, and is herein shown with a rotary cutter C having inclined or helical blades $c$.

The housing of the headstock 82 is formed with a core 90 (see Fig. 4) in which the center 83 is rigidly secured. Rotatably mounted on the core 90 is a gear 91 having an annular flange 92 concentric with the center 83. To prevent backlash in the gearing, a spring pressed brake $92^s$ is mounted in engagement with the flange 92. A block 93 is secured in a notch in the end of the flange 92, and is provided with a pin 94 projecting parallel to the arbor 84. The pin is adapted to engage a dog 95 adjustably mounted on the arbor to rotate the latter with the gear 91.

The arbor 84 is adjusted in the dog 95 at the beginning of the operation to properly locate the cutter blades c with respect to the grinding wheel G. The correct position is determined by means of a gage (see Figs. 5 and 6) which comprises a finger 96 adapted to be oscillated into position next to the effective area of the grinding face. The finger is secured to the lower end of a vertical stub shaft 97 which extends through and is reciprocable in a bushing 98, and which is provided with a knob 99 on its upper end. The bushing is adjustably clamped in a bore 100 in a lug 101 on the hood 47 by a set screw 102, and determines the upper position of the finger. A shank 103 on the knob 99 extends slidably into the upper end of the bore 100, and is pressed upwardly by a coil spring 104 mounted on the shaft 97 above the bushing 98. A spring detent 105 in the lug 101 is adapted to engage a notch 106 in the knob 99 to hold the finger resiliently in operative position. The gage is adjustable with the hood 47 upon rotation of the nut 50 to compensate for wear on the grinding wheel G and to adapt it to grinding wheels of different forms and sizes. In setting the cutter A, the arbor 84 is adjusted in the dog 95 to rotate the extreme upper edge of one of the blades c against the lower end of the finger 96. When not in use the finger is moved out of the way into the position shown in Fig. 2.

To slowly and continuously rotate the arbor 84 (see Fig. 4), the gear 91 is in mesh with a pinion 107 on a shaft 108 which is adjustable with the headstock 82 and which extends slidably through a gear housing 109 mounted on the left end of the table 71. The shaft is connected through a train of change speed gears 110 in the housing to a stub shaft 111. By changing the intermediate gears 110, the speed of the shaft 108 can be varied so as to conform to cutters and reamers of different sizes and of different numbers of blades. The stub shaft 111 is connected through a universal joint 112 in vertical alinement with the stud 72, an extensible shaft 113, and a universal joint 114 to a shaft 115 mounted in bearings 116 in the bracket 64. A worm wheel 117 on the shaft 115 meshes with a worm 118 splined to the drive shaft 55.

To reciprocate the carriage 30 in timed relation to the rotation of the cutter C, a left hand cam 119 and a right hand cam 120 having cam grooves 121 and 122 respectively are mounted on the shaft 115 at opposite sides of the worm wheel 117. Slidably mounted in a longitudinal guideway 123 in the lower surface of the sub-base 69 and held therein by a gib 124 are a pair of slides 125 and 126 having depending pins 127 and 128 engaging the grooves 121 and 122 respectively. A pair of locking pins 129 and 130 are slidably mounted in the front edge of the sub-base 69, and are adapted to engage two depressions 131 and 132 in the slides 125 and 126 respectively to lock the latter selectively to the carriage 30. Each pin is provided with a shoulder 133 (see Fig. 7) slidable in a bushing 134, and is yieldingly pressed inwardly by a coil spring 135. Pivotally mounted on the sub-base between the pins 129 and 130 is an interlocking lever 136, the opposite ends of which extend through notches 137 in the bushings 134 and are adapted to engage the shoulders 133 to hold the pins in their retracted positions. The lever serves to prevent both slides 125 and 126 from being locked to the carriage 30 at the same time. The cam groove 121 (see development diagrams in Figs. 13 to 16) comprises sections $a$ and $a'$ respectively, formed to give the carriage 30 a slow working movement to the left and a quick return movement to the right. Sections $b$ and $b'$ of the cam groove 122 are adapted to effect a slow movement of the carriage to the right and a quick return to the left. For convenience the slow movement is designated as the grinding stroke and the quick return movement as the return stroke. The slope or pitch of the cam sections $a$ and $b$ is such that successive points along the cutting edge of the blade being ground are rotated into grinding position as they move across the effective cutting area of the grinding wheel G. To present the blades c of the cutter successively to the grinding wheel G, the velocity ratio of the arbor 84 and the cam shaft 115 is made to equal the number of the blades, and in the present instance is therefore 6:1. To insure accurate grinding it is necessary that the cutter C is initially correctly positioned relative to the grinding wheel G and the cam grooves.

Means is provided for effecting a relative lateral movement between the face of the grinding wheel G and the cutter to bevel the ends of the blades c (see Figs. 8 to 12). This means preferably is operable to oscillate the table 71 about the pivot stud 72, and comprises a bracket 138 secured to the free end of the table opposite the spring 77. Slidably mounted in a guideway 139 on the bracket 138 is a slide 140 having a laterally extending cam arm 141 and having depending lugs 142 on its opposite ends. Screws 143 threaded through the lugs 142 to engage opposite sides of the bracket 138 serve as a means for adjusting the slide 140 longitudinally of the table 71, and a clamp screw 144 extending through an elongated slot 145 is adapted to lock the slide securely in adjusted position. The cam arm 141 engages a cam 146 having a cam face the right end of which is parallel to the sub-base and holds the table 71 against oscillation while the cutting edge of the blade is being ground, and the left end of which is inclined rearwardly to permit oscillation of the table by the spring 77 near the end of the cutting stroke for the purpose of beveling the end of the blade.

The cam 146 is supported by a block 147 in a casing 148 which is adjustably mounted on a dovetailed guide 149 extending laterally of the base 28. A non-rotatable screw 150 extends rearwardly on the casing, and has a threaded engagement with a rotatable sleeve 151. The latter is mounted in a bracket 152 on the rear end of the guide 149, and is provided with a hand wheel 153 for adjusting the casing 148 toward and from the table 71.

Pivotally mounted in the left and right sides of the block 147 are a left hand cam 154 and a right hand cam 155 respectively which are adapted to selectively engage a cam roller 156 carried by the bracket 138 to oscillate the cutter C away from the grinding wheel G for the quick return movement of the carriage 30. The cam face of each cam terminates next to the pivot in a circular recess 157 which is partially defined by a forwardly extending arm 158. Each cam is pressed rearwardly from the roller 156 by a coil spring 159 mounted between the arm 158 and one side of the casing 148, and is moved forwardly when the roller engages the arm. A pair of pawls 160 and 161 are pivotally mounted in opposite sides of the block 147, and are pressed toward each other by coil springs 162 to respectively engage the free ends of the cams 154 and 155 as the latter are moved forward. Extending through opposite sides of the casing 148 are a pair of adjustable screws 163 adapted to engage the heels of the pawls to hold the latter inoperative. Only one of the pawls is operative at one time. Upon engagement by a pawl of the associated cam, that cam is held in forward position and in the return movement of the carriage will oscillate the table 71 against the force of the spring 77.

The theory and operation will now be described with reference first to a left hand cutter and then to a right hand cutter. Initially, the cam 119 is locked to the sub-base 69, the carriage 30 is positioned to begin movement to the left so as to locate the cutter in the grinding stroke, and the pawl 161 for the right hand cam 155 is rendered inoperative. The position of the pin 127 in the groove 121 corresponding to that of the carriage is indicated in full lines in Fig. 13. The gage finger 96 is now oscillated into operative position to locate a point $d$ (see Fig. 20) on the cutting face of the grinding wheel G slightly below the horizontal plane of the latter, and the cutter C is set with the arbor 84 to position the upper left end of the cutting face of one of the blades $c$ against the lower end of the finger. This position is represented in Figs. 17, 18 and 19. Since the axis of the arbor 84 is substantially below that of the grinding wheel G and below the point $d$, each blade $c$ will be relieved, as illustrated in Figs. 20 and 27, along line $d$—$e$ falling well within the arc $d$—$f$ about the center of the cutter. The effective grinding area of the wheel G is thus located between the axes of grinding spindle and the arbor, and its plane is substantially along a cord of the circle of rotation of the blade edge being ground.

In the movement of the carriage 30 to the left, the cam arm 141 rides on the cam 146, and the cutter C moves along line $h$—$d$ to the dotted position shown in Fig. 13 to grind the crown of the blade, the cutter being rotated in timed relation to this movement to bring successive points along the cutting edge of the blade into engagement with the cutting face at the point $d$. The position of the pin 127 in the cam groove 121 at this stage is illustrated in dotted lines in Fig. 13.

Upon further movement of the carriage, the cam arm 141 rides onto the inclined end of the cam 146, and thereby permits the table 71 to be gradually oscillated. Thereupon the cutter C moves along line $d$—$i$ (see Fig. 21), which is the resultant of the longitudinal and oscillatory movements, and which is tangential to the curved area $g'$ of the cutting face at the point $d$. This movement bevels the right end of the blade edge along the line $d$—$i$ to provide a suitable lead, and relieves the beveled edge along line $i$—$j$, which falls well within the arc $i$—$k$ about the center of the cutter. Since the point $d$ shifts from the element $g$ to the curved element $g'$ upon oscillation of the table 71, the beveled edge is slightly rounded at its junction with the cutting edge. This is advantageous in the cutting action of the cutter in going into a hole. The position of the cutter C at the completion of the beveling cut is illustrated in Figs. 22 to 26. Since the point $d$ is located slightly below the horizontal plane of the grinding wheel G, the inclined edge $d$—$i$ is given a greater relief than the cutting edge of the crown. This is due to the additional component of the relief generated along line $l$—$m$ by the curvature of the rounded inner edge of the grinding face. The difference in total relief of the blade crown and the beveled end is illustrated in Fig. 27.

As the carriage 30 moves into its extreme left position, the roller 156 engages the arm 158, thereby moving the cam 154 forward and permitting it to be engaged by the pawl 160. The pin 127 in the groove 121 and the cutter C assume positions shown in full lines in Fig. 14. In movement of the carriage to the right, the roller 156 in leaving the recess 157 oscillates the table 71 forwardly beyond its central position, and then rides along the cam 154 thereby causing the cutter C to return along the line $i$—$n$ and line $n$—$o$ out of engagement with the grinding wheel G. As the carriage moves into its extreme right position, in which the pin 127 and the cutter assume positions illustrated in dotted outline in Fig. 14, the roller 156 disengages the pawl 160, thereby releasing the cam 154 and permitting the spring 77 to return all parts to their initial positions. During the return movement of the carriage, the cutter C is rotated to an extent such that in the next operation the following blade is automatically positioned in the grinding stroke. The operation is repeated until all the blades $c$ have been ground to the desired extent, the grinding wheel G being advanced by means of the hand wheel 45.

In grinding a right hand cutter, the operation is similar in principle. Initially, the cam 120 is operatively connected to the sub-base, the cutter is set with the carriage in position to begin movement to the right, the pawl 160 is inoperative, and the cam arm 141 is resting on the inclined face of the cam 146. Movement of the carriage to the right results in moving the cutter first along line $p$—$q$ to bevel the end of the blade, and then along line $q$—$r$ to grind the crown of the cutting edge (see Figs. 15 and 16). At the completion of the cut, the cam 155 is moved into and held in operative position, so that in the return movement of the carriage, the cutter moves first along line $r$—$s$ and then along line $s$—$t$. Upon disengagement of the pawl 161 with the cam 155, the cutter moves along line $t$—$p$ into its initial position.

By the above operation each blade is so ground that the helical cutting edge of the crown lies in a cylindrical area and the beveled edge lies in an area tapering from said cylindrical area.

While in the present instance the cam 146 is shown with a straight inclined surface to permit a uniform oscillation of the table 71 at one end of the cutting stroke, it is to be understood that cams of different forms can be used to obtain any other desired oscillation. Thus in Fig. 28 there is shown a fragmentary section of a cylinder reamer C′, each blade $c'$ of which is beveled at its opposite ends, the bevel at the lead end, however, being composed of a plurality of sections inclined at different angles to the cutting edge. To successively grind these sections, it is necessary to vary the rate of oscillation of the table 71, and therefore to provide a cam 146 having a composite surface. When straight blades without beveled ends or off-set portions are to be ground, the screw 78 is adjusted to hold the table against rearward movement from its central or neutral position on the sub-base.

In rotating each cutting edge as it is reciprocated across the grinding face, the grinding contact for each point on the edge shifts upwardly on the grinding face, and hence a gradually accelerated relief is obtained.

I claim as my invention:

A relief grinding machine having, in combination, a grinding wheel having an annular grinding face, the radial elements of said face being straight over a substantial portion of the width of said face and receding inwardly at their inner ends, means for supporting a cutter having a helical cutting edge and presenting said edge to said face between the axes of said wheel and said cutter, said grinding wheel being laterally inclined relative to said means, means for moving said first mentioned means relatively to said grinding wheel so as to move said edge longitudinally across said face, and means for rotating said cutter in timed relation to the inclination of said edge, the points of contact at opposite sides of said face being in different elements so as to provide a gradually accelerated relief.

In testimony whereof, I have hereunto affixed my signature.

GERARD A. DE VLIEG.